United States Patent
Naor et al.

(10) Patent No.: US 8,122,217 B2
(45) Date of Patent: Feb. 21, 2012

(54) METHOD OF A FULL COVERAGE LOW POWER MODE FOR STORAGE SYSTEMS STORING REPLICATED DATA ITEMS

(75) Inventors: Dalit Naor, Haifa (IL); Danny Harnik, Haifa (IL); Itai Segall, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 12/436,163

(22) Filed: May 6, 2009

(65) Prior Publication Data

US 2010/0287397 A1      Nov. 11, 2010

(51) Int. Cl.
G06F 12/02         (2006.01)
(52) U.S. Cl. ........................ 711/165; 711/154
(58) Field of Classification Search .................. 711/165, 711/154
See application file for complete search history.

(56) References Cited

U.S. PATENT DOCUMENTS

| | | | |
|---|---|---|---|
| 6,065,124 A * | 5/2000 | Lee ............................... | 713/323 |
| 6,512,652 B1 | 1/2003 | Nelson et al. | |
| 6,925,529 B2 | 8/2005 | Bohrer et al. | |
| 7,210,005 B2 | 4/2007 | Guha et al. | |
| 7,216,244 B2 * | 5/2007 | Amano ......................... | 713/324 |
| 7,234,074 B2 | 6/2007 | Cohn et al. | |
| 7,333,363 B2 * | 2/2008 | Nakai et al. ............... | 365/185.08 |
| 7,451,265 B2 * | 11/2008 | Traister et al. ................ | 711/103 |
| 7,490,206 B2 * | 2/2009 | Jann et al. ..................... | 711/165 |
| 7,506,124 B2 * | 3/2009 | Sharma et al. ................ | 711/165 |
| 7,519,787 B2 * | 4/2009 | Yamane et al. ............... | 711/165 |
| 2006/0107099 A1 | 5/2006 | Pinheiro et al. | |

FOREIGN PATENT DOCUMENTS

WO       WO 03/065360 A1       8/2003

OTHER PUBLICATIONS

Dennis Colarelli, Dirk Grunwald: Massive arrays of idle disks for storage archives. SC 2002: 1-11.
Dong Li, Jun Wang: EERAID: energy efficient redundant and inexpensive disk array. ACM SIGOPS European Workshop 2004: 29.
Dushyanth Narayanan, Austin Donnelly, and Antony Rowstron: Write Off-Loading: Practical Power Management for Enterprise Storage. FAST 2008.
Eduardo Pinheiro, Ricardo Bianchini, Cezary Dubnicki: Exploiting redundancy to conserve energy in storage systems. SIGMETRICS/Performance 2006: 15-26.
Eduardo Pinheiro, Ricardo Bianchini: Energy conservation techniques for disk array-based servers. ICS 2004: 68-78.
Ion Stoica, Robert Morris, David Karger, M. Frans Kaashoek, Hari Balakrishnan: Chord: A Scalable Peer-to-peer Lookup Service for Internet Applications. ACM SIGCOMM 2001.
Mark W. Storer, Kevin M. Greenan, Ethan L. Miller and Kaladhar Voruganti: Pergamum: Replacing Tape with Energy Efficient, Reliable, Disk-Based Archival Storage. FAST 2008.

(Continued)

*Primary Examiner* — Michael Tran

(57) ABSTRACT

A novel and useful method of implementing a full coverage low power mode in a storage system comprised of one or more memory storage devices storing replicated data items. A subset of the memory storage devices is chosen whose replicated data items require the least amount of storage. If the chosen subset stores uncovered data items, these data items are copied to an auxiliary memory storage device. The storage system can enter a full coverage low power mode by powering down the chosen subset of memory storage devices.

25 Claims, 7 Drawing Sheets

OTHER PUBLICATIONS

Xiaoyu Yao, Jun Wang: RIMAC: a novel redundancy-based hierarchical cache architecture for energy efficient, high performance storage systems. EuroSys 2006: 249-262.

Qingbo Zhu, Zhifeng Chen, Lin Tan, Yuanyuan Zhou, Kimberly Keeton, John Wilkes: Hibernator: helping disk arrays sleep through the winter. SOSP 2005: 177-190.

* cited by examiner

METHOD OF A FULL COVERAGE LOW POWER MODE FOR STORAGE SYSTEMS STORING REPLICATED DATA ITEMS

FIELD OF THE INVENTION

The present invention relates to the field of data storage, and more particularly relates to a method of implementing a full coverage low power mode in a storage system storing replicated data items on a plurality of memory storage devices.

SUMMARY OF THE INVENTION

There is thus provided in accordance with the invention, a method of selecting one or more memory storage devices in a storage system, the storage system comprising a first quantity of memory storage devices storing a plurality of replicated data items, the method comprising the steps of setting a percentage of the first quantity of memory storage devices to be selected in a first computer process and providing the set percentage to a second computer process and identifying a second quantity of memory storage devices in accordance with the set percentage in the second computer process, the identified memory storage devices storing a subset of said plurality of replicated data items.

There is also provided in accordance of the invention, a computer program product for selecting one or more memory storage devices in a storage system, the storage system comprising a first quantity of memory storage devices storing a plurality of replicated data items, the computer program product comprising a computer usable medium having computer usable code embodied therewith, the computer usable program code comprising computer usable code configured for setting a percentage of the first quantity of memory storage devices to be selected in a first computer process and providing said set percentage to a second computer process and computer usable code configured for identifying a second quantity of memory storage devices in accordance with the set percentage in the second computer process, the identified memory storage devices storing a subset of said plurality of replicated data items.

There is further provided in accordance of the invention, a method of implementing a full coverage low power mode in a storage system, the storage system comprising a plurality of replicated data items stored on a plurality of memory storage devices, the method comprising the steps of setting a percentage of memory storage devices to be powered down during the low power mode in a first computer process and providing the set percentage to a second computer process, identifying a first quantity of the memory storage devices in accordance with the set percentage, the identified first quantity of memory storage devices storing a subset of the plurality of replicated data items in the second computer process; and providing the subset to a third computer process and copying data items stored solely on the subset to an auxiliary storage subsystem in the third computer process, the auxiliary storage subsystem comprising a second quantity of memory storage devices.

There is also provided in accordance of the invention, a method of implementing a full coverage low power mode in a hierarchical distributed storage system storing one or more replicated data items, the distributed storage system comprising a plurality of memory storage devices, the method comprising the steps of determining the number of replications of each data item in the hierarchical distributed storage system, identifying one or more subsets of the plurality of memory storage devices, each identified subset storing one instance of each of the one or more replicated data items and selecting one identified subset of the plurality of memory storage devices to be active during low power mode.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
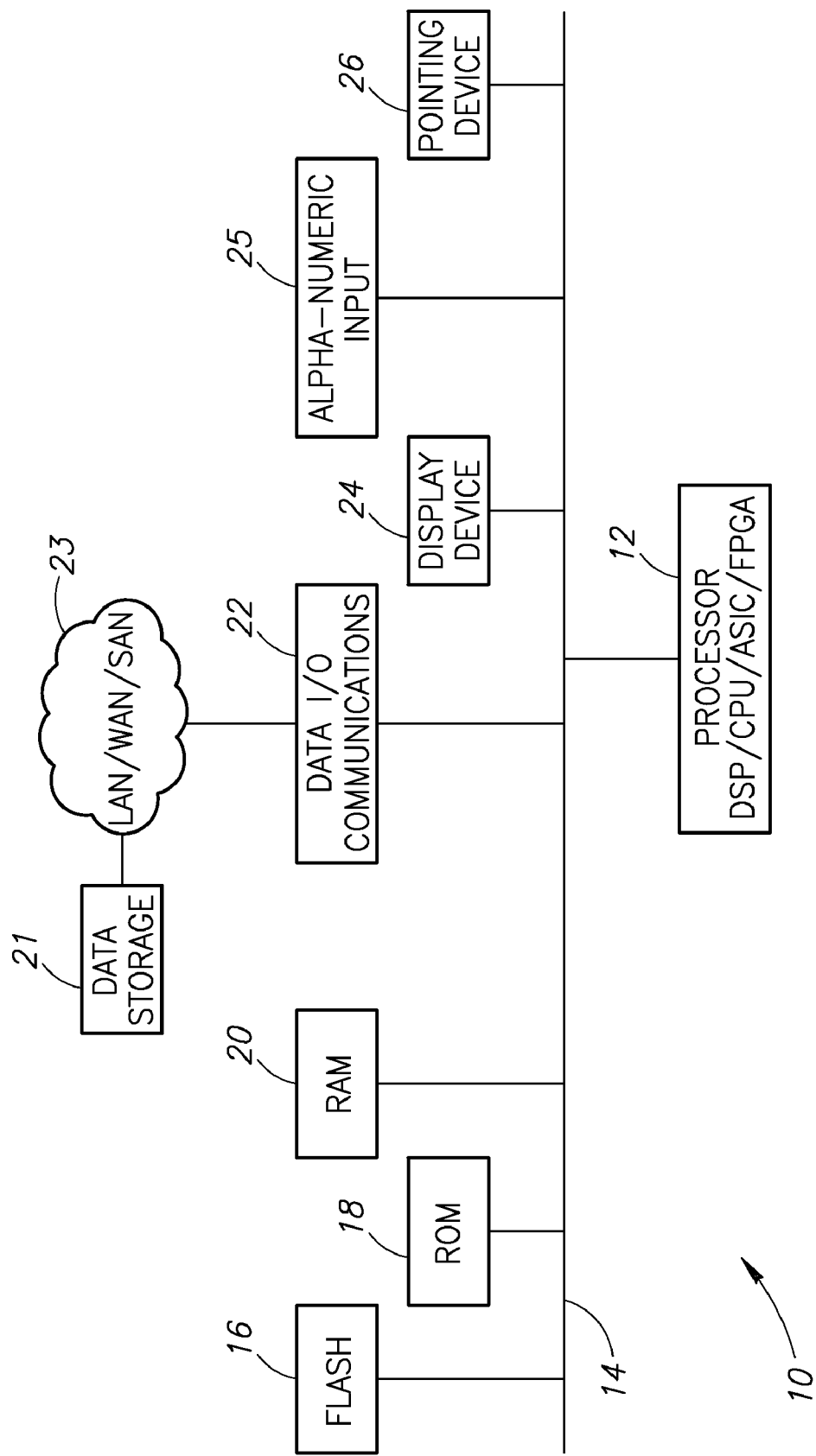
FIG. 1 is a block diagram illustrating an example computer processing system adapted to implement the full coverage low power mode storage method of the present invention.

The following notation is used throughout this document:

| Term | Definition |
| --- | --- |
| ASCII | American Standard Code for Information Interchange |
| ASIC | Application Specific Integrated Circuit |
| CD-ROM | Compact Disc Read Only Memory |
| CPU | Central Processing Unit |
| DSP | Digital Signal Processor |
| EEROM | Electrically Erasable Read Only Memory |
| EPROM | Erasable Programmable Read-Only Memory |
| FPGA | Field Programmable Gate Array |
| FTP | File Transfer Protocol |
| HTTP | Hyper-Text Transport Protocol |
| I/O | Input/Output |
| LAN | Local Area Network |
| NIC | Network Interface Card |
| RAM | Random Access Memory |
| RF | Radio Frequency |
| ROM | Read Only Memory |
| SAN | Storage Area Network |
| URL | Uniform Resource Locator |
| WAN | Wide Area Network |

Detailed Description of the Invention

The present invention is a method of implementing a full coverage low power mode in a storage system comprised of one or more memory storage devices storing both replicated data items. A subset of the memory storage devices is chosen whose replicated data items require the least amount of storage. These replicated data items are then copied to an auxiliary memory storage device. After copying the replicated data items, the storage system can enter a full coverage low power mode by powering down the chosen subset of memory storage devices.

For replicated data stored on a hierarchical distributed storage system, the method of the present invention powers down all storage devices storing all replications of the data items, leaving a single storage device operational for each data item. Each instance of a data item in the hierarchical distributed storage system is coupled to a distinct node in the storage system, thereby ensuring that no two copies of each data element are placed in the same failure domain. The low power mode method of the present invention powers down a fraction of each node in the storage system.

The present invention is operative to aid in the design of storage systems which can enter a low power mode at specified times. The low power mode provides full data coverage for read operations, while enabling all write operations to be buffered during low power mode. The write operations are committed to the storage system upon exiting the low power mode. While power savings can be maximized by efficient us of data placement functions, the use of auxiliary memory storage enables the method of the present invention to achieve significant power savings regardless of data placement.

As will be appreciated by one skilled in the art, the present invention may be embodied as a system, method, computer program product or any combination thereof. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A block diagram illustrating an example computer processing system adapted to implement the full coverage low power mode storage method of the present invention is shown in FIG. 1. The computer system, generally referenced 10, comprises a processor 12 which may comprise a digital signal processor (DSP), central processing unit (CPU), microcontroller, microprocessor, microcomputer, ASIC or FPGA core. The system also comprises static read only memory 18 and dynamic main memory 20 all in communication with the processor. The processor is also in communication, via bus 14, with a number of peripheral devices that are also included in the computer system. Peripheral devices coupled to the bus include a display device 24 (e.g., monitor), alpha-numeric input device 25 (e.g., keyboard) and pointing device 26 (e.g., mouse, tablet, etc.)

The computer system is connected to one or more external networks such as a LAN or WAN 23 via communication lines connected to the system via data I/O communications interface 22 (e.g., network interface card or NIC). The network adapters 22 coupled to the system enable the data processing system to become coupled to other data processing systems or remote printers or storage devices through intervening private or public networks. Modems, cable modem and Ethernet cards are just a few of the currently available types of network adapters. The system also comprises magnetic or semiconductor based storage device 21 for storing application programs and data. The system comprises computer readable storage medium that may include any suitable memory means, including but not limited to, magnetic storage, optical storage, semiconductor volatile or non-volatile memory, biological memory devices, or any other memory storage device.

Software adapted to implement the full coverage low power mode storage method of the present invention is adapted to reside on a computer readable medium, such as a magnetic disk within a disk drive unit. Alternatively, the computer readable medium may comprise a floppy disk, removable hard disk, Flash memory 16, EEROM based memory, bubble memory storage, ROM storage, distribution media, intermediate storage media, execution memory of a computer, and any other medium or device capable of storing for later reading by a computer a computer program implementing the method of this invention. The software adapted to implement the full coverage low power mode storage method of the present invention may also reside, in whole or in part, in the static or dynamic main memories or in firmware within the processor of the computer system (i.e. within microcontroller, microprocessor or microcomputer internal memory).

Other digital computer system configurations can also be employed to implement the full coverage low power mode storage method of the present invention, and to the extent that a particular system configuration is capable of implementing the system and methods of this invention, it is equivalent to the representative digital computer system of FIG. 1 and within the spirit and scope of this invention.

Once they are programmed to perform particular functions pursuant to instructions from program software that implements the system and methods of this invention, such digital computer systems in effect become special purpose computers particular to the method of this invention. The techniques necessary for this are well-known to those skilled in the art of computer systems.

It is noted that computer programs implementing the system and methods of this invention will commonly be distributed to users on a distribution medium such as floppy disk or CD-ROM or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

Full Coverage Low Power Mode Storage Method

The method of the present invention enables a full coverage low power mode for storage systems storing replicated and data items on multiple memory storage devices. To achieve a full coverage low power mode, the method of the present invention powers down a fraction of the memory storage devices during low workload times. Alternatively, one or more nodes of the storage system are powered down, with each node comprising multiple memory storage devices.

The method of the present invention is dependant on (1) Wisely choosing wisely the memory storage devices to be powered down during a low power mode and (2) Maintaining one or more auxiliary memory storage devices for full coverage. In the present invention, a data item is defined as uncovered if all of its replicas (i.e. instances) reside on memory storage devices that have been powered down. Wisely choosing the memory storage devices to power down minimizes the number of uncovered data blocks (i.e. all instances of those data items are stored in data blocks on the chosen memory storage devices).

Once a subset of memory storage devices is chosen (i.e. a subset of memory storage devices that leaves excellent coverage during low power mode), additional auxiliary memory storage devices are maintained to store a single copy of each uncovered data item. This guarantees that during low power mode, each data item has at least one copy on a memory storage device that is operational. Given a wise choice of a powered down memory storage device subset, the number of auxiliary memory storage devices disks will be much smaller than the number of memory storage devices to be powered down (hence the energy savings). Maintaining the auxiliary storage devices during full power mode is performed in an online fashion with little overhead. This enables seamless switching between full power and low power modes.

As discussed supra, the method of present invention selects memory storage devices to be powered down during a low power mode. Data items whose replications (i.e. instances) reside solely on those selected memory storage devices are copied to one or more auxiliary memory storage devices. Note that the data schema is then changed to reflect the addition of the auxiliary memory storage device(s). This enables data items (i.e. an additional instance of each data item) to be updated on the auxiliary memory storage device(s) when the storage system is operating in full power mode.

Aside from the initial setup, wisely choosing a subset of memory storage devices to be powered down is a process that can be performed on an ongoing basis. As data is added (or removed) from the storage system, this ensures that both an optimal number of memory storage devices are selected to be powered down during low power mode, while at the same time ensuring that an optimal number of auxiliary storage devices are utilized. The goal for the low power mode is to power down as many (primary) memory storage devices as possible while maintaining the fewest number of auxiliary memory storage devices.

To retrieve (i.e. read) a data item during low power mode, data items are retrieved from either a regular node (i.e., not an auxiliary node) or an auxiliary node, depending on the location of the live copy of the data item during low power mode. Updates (i.e. during low power mode) are performed regularly to all live nodes (including writes to the auxiliary nodes). In addition, all update (i.e. write) operations involving the nodes in the designated subset are recorded in a log file, in order to be completed during regular mode (i.e. nodes which were powered down are updated at power up). In the event the log fills up, nodes in a designated subset can be selectively powered up in order to relieve the write log. Upon re-entering full power mode, the appropriate memory storage devices are updated with log file transactions, thereby preserving the appropriate number of replications for each data item.

The number of memory storage devices that can be powered down and how many auxiliary memory storage devices that are therefore needed to provide full coverage is dependant on system specifics. Among the important factors is the specific placement function being used (i.e. where each instance of each data item is stored in the storage system) and the number of copies held for each data block (the replication parameter).

If the set of memory storage devices to be powered down during low powered mode is determined in advance, then maintaining the data on the auxiliary memory storage devices can be done on-line (i.e. during the full power mode). When writing a new data block or modifying an existing one, the system (or alternatively, a responsible node) can check whether this data block needs to be copied to the auxiliary memory storage device. If so, the data block is updated accordingly in the auxiliary memory storage device. This maintenance methodology enables system to enter low power at any point (and immediately), without requiring a long preparation period for the cache disks.

The method of the present invention gains efficiency in systems having high replication (e.g. at least 3 copies for each data block). The higher the replication, the more memory storage devices can be powered down, and fewer auxiliary memory storage devices are required to provide full data coverage. A crucial consideration when implementing the method of the present invention is the placement function of the underlying storage system. Given a data block d, the placement function decides on what memory storage device to store each of the d instances of this data block. Two commonly used placement function strategies are random placement and consistent hashing over a ring, both of which will be discussed infra.

In operation, the method of the present invention first chooses p, a percentage of the m memory storage devices to be powered down during low power mode. p can either be an input parameter or a calculated value (i.e. within given constraints). Therefore the number of memory storage devices that will be powered down during low power mode is expressed as p*m. In the storage system, the number of replications of each data item is d (a consistent number for all data items). For a subset of size p*m, the percentage of uncovered data items is denoted by q. Therefore, for each subset (i.e. p*m), the number of auxiliary memory storage devices a needed to maintain full coverage during low power mode is a=q/d*m.

The goal is to find the largest possible separation between p and q. Finding the largest separation will require the addition of the fewest auxiliary memory storage devices. For any data placement scheme and every p there exists a subset of size p*m for which $q \sim p^d$. For some placement schemes there are subsets that achieve a much smaller q (possibly zero).

As discussed supra, the method of the present invention is dependant on choosing the power down subset wisely. Choosing wisely is highly dependent on the placement function. At times, a large fraction of the memory storage device can be powered down and still achieve full coverage, therefore not requiring any auxiliary memory storage devices. In these cases, finding a good set is highly desirable. In other cases, there might be is no possibility of achieving full coverage (i.e. when powering down a fraction of memory storage devices). In this case, the goal is to find a subset of memory storage devices providing maximal coverage (or close to maximal) in order to minimize the number of auxiliary memory storage devices disks required to maintain full coverage.

A first strategy operative to choose a subset of memory storage devices is to utilize knowledge on the structure of the placement function (e.g., the most basic setting of consistent hashing). For some placement strategies (e.g., the random placement function) this strategy is not efficient, since it involves a computationally complex problem, and the exhaustive search required is not practical.

A second strategy operative to choose a subset of memory storage devices is to select a random subset. This method is the simplest to implement, and typically provides a solution that is close to the expected value (namely, approximately $p^d$ uncovered data items). One embodiment of this strategy is to sample a number of random subsets and to select the one providing the best coverage. With very high probability this yields a result that is better than the expected value.

A third strategy operative to choose a subset of memory storage devices is to use a greedy algorithm. A greedy algorithm iterates adding single nodes to the subset, in each step adding the best current candidate to the subset. One embodiment of a greedy algorithm is to choose nodes for the non-designated (i.e. power-up) subset. At each step single additional node is chosen which covers the most data items that were not covered thus far.

While a greedy algorithm is quite feasible for almost any setting, its efficiency may vary depending on the system architecture. If conducted in a centralized manner, it requires enumerating all available nodes, and finding the best choice from each iteration. Alternatively, the nodes themselves can compute their current cover status and report this to a central component that is then required to simply find the maximum. This requires the central component to broadcast the list of currently chosen nodes to all of the remaining nodes after each iteration.

Figure 2:
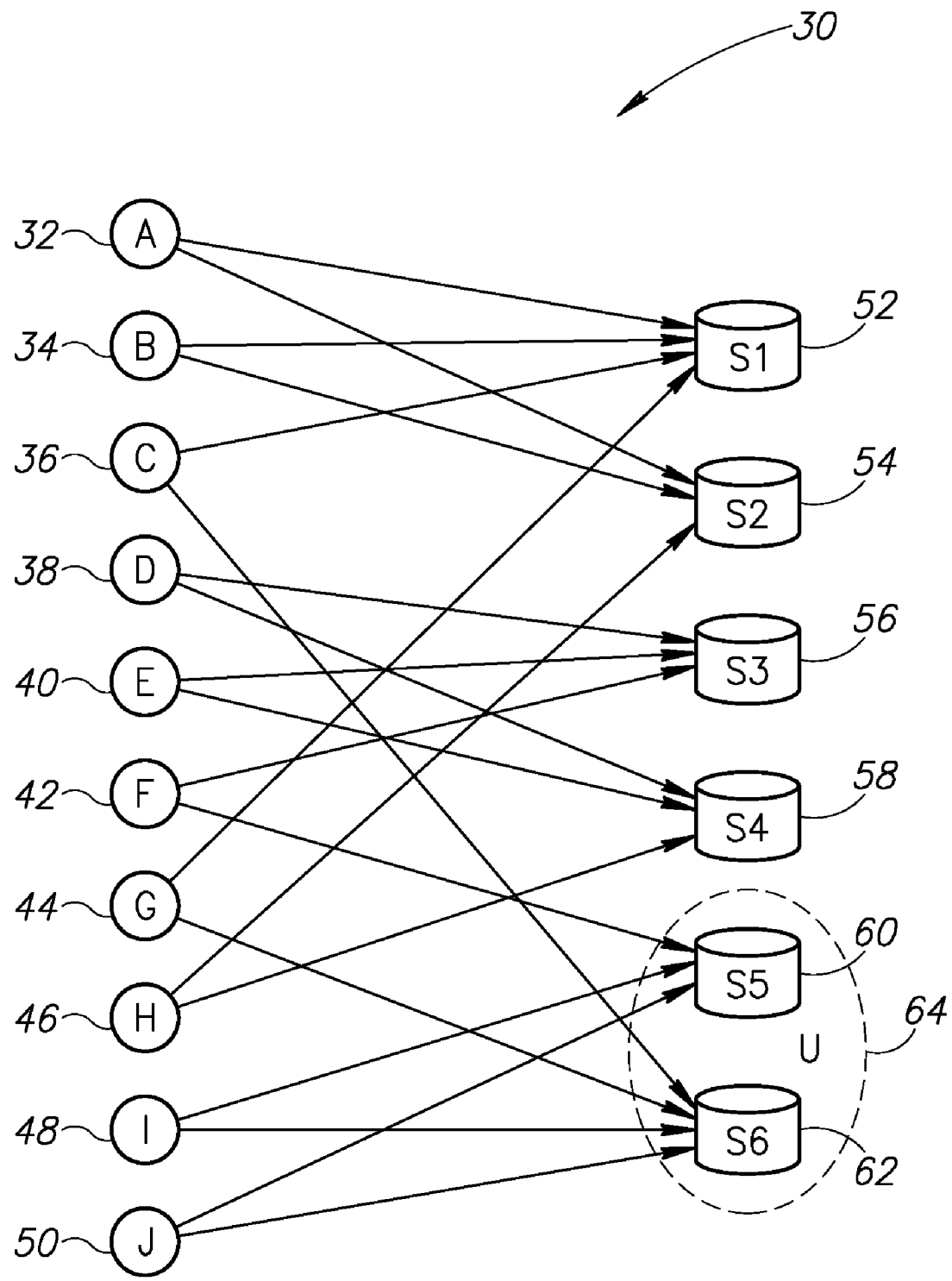
FIG. 2 is a block diagram illustrating the replicated data item selection method of the present invention.

A block diagram illustrating the replicated data item selection method of the present invention is shown in FIG. 2. The block diagram, generally referenced 30, comprises replicated data items A 32, B 34, C 36, D 38, E 40, F 42, G 44, H 46, I 48, J 50, memory devices S1 52, S2 54, S3 56, S4 58, S5 60, S6 62 and memory storage device subset U. All data items have two replications. Memory storage devices S1 and S6 each store four instances of replicated data. Memory storage devices S2, S3, S4, and S5 each store three instances of replicated data. If p is ⅓, then the optimal subset U comprises memory storage devices S5 and S6. Subset U stores all instances of data items I and J, as well as a single instance of data items C, F and G. Since data items C, F and G have coverage outside subset U, only data items I and J are copied to an auxiliary memory storage device (i.e. a third replication for each), yielding a net savings of one memory storage device during low power mode (S5 and S6 are powered down).

As discussed supra, a crucial consideration when implementing the method of the present invention is the placement function of the underlying storage system. Two common placement functions are random placement and consistent hashing.

The random placement function refers to random (or pseudorandom) allocation of locations for each of the replicas. More precisely, each data item is stored in distinct memory storage devices that are chosen according to the random distribution. In practice, some modifications are typically required to avoid too much of disparity between the number of data items allocated at single memory storage device. For example, if one memory storage device is fully utilized, allocating new replicas to this memory disk needs to be avoided. These modifications form very weak correlations between the placements of different data items, typically only when memory storage devices become full. For our purposes, we can consider the choices as fully independent.

For every designated subset of size Mp, the expected number of uncovered data items is $$N\binom{Mp}{d}/\binom{M}{d},$$

where expectancy is over the random choice of the placement. Therefore, $$\exp\_q = \binom{Mp}{d}/\binom{M}{d} \quad (1)$$

where exp_q denotes the expected fraction q. In operation, first fix the designated subset. Then, for each data item, compute the probability that all copies are inside this set. Note that exp_q is approximately $p^d$ (exp_q is bounded from above by this amount and tends to it as M grows).

Figure 3:
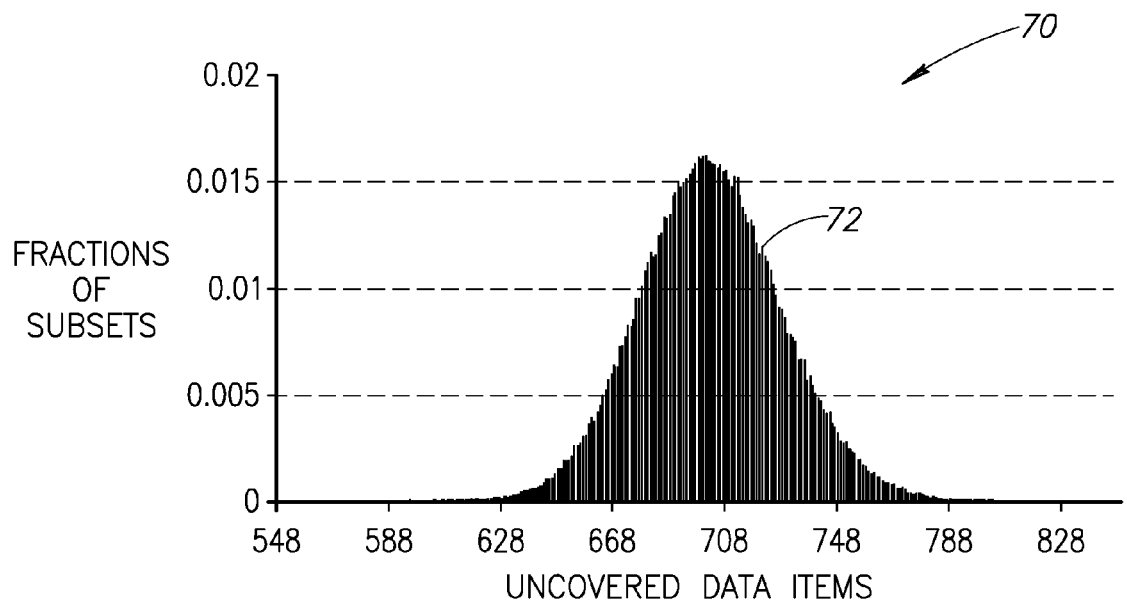
FIG. 3 is a chart illustrating a distribution of coverage per subset for data items stored utilizing a random placement function implemented on a storage system implementing the full coverage low power mode storage method of the present invention.

One issue is how much does such subset deviate from the expectancy, or in other words, how good or bad can the best coverage be for single instantiation of the placement function. A chart illustrating a distribution of coverage per subset for data items stored utilizing a random placement function implemented on a storage system implementing the full coverage low power mode storage method of the present invention is shown in FIG. 3. The graph, generally referenced 70 comprises data series 72, which exhibits the situation for one instantiation of the random placement, which shows nice normal looking distribution around the mean. That is, taking random subset is likely to result in coverage that is around the expected value exp_q. This graph is reflective a system with random placement function, M=20 nodes, replication d=3 and N=6666 data items. The fraction of the power down set is p=½. For each number of uncovered data items, the chart plots the fraction of subsets of size Mp that yield this coverage. The calculated expectancy for uncovered items is N*exp_q≈702 which fits the peak nicely.

Experiments run to evaluate the success of the various heuristics for choosing a good designated subset exhibited that the "best of 10 random subsets" method achieves results that are marginally better than the average, similar to what one would expect from a random normal distribution. The greedy tests conducted achieved an improvement of a constant factor over the expected. This factor was more significant for lower p.

As discussed supra, one alternative to the random placement function is the consistent hashing placement scheme, which has proved useful in Peer-to-Peer networks and is the underlying placement function for a number of distributed storage systems. The basic consistent hashing placement algorithm operates on a fixed size range, e.g., the range of 128 bit strings (that is $2^{128}$ values). This range is viewed as a cyclic ring (where the value $2^{128}-1$ is followed by the value zero). Each of the M nodes in the system is mapped (pseudo-) randomly onto this ring, typically using a hash function. According to this mapping, the ring is divided into M regions of consecutive values on the ring. Each region consists of consecutive values between two neighboring nodes on the ring and is attributed to the node at the beginning of the region (a region is "owned" by the corresponding node). In order to place a data item, its name (or its contents) is also hashed onto a point on the ring. The data item is stored in the node owning the region which it hit. Additional replicas are placed on the next d−1 consecutive regions (or nodes owning the next regions).

The consistent hashing scheme defined above has attractive properties, but is suspect to problems regarding both load balancing (some nodes are bound to be very light) and failure from recovery (limited in its ability to parallelize). A standard technique utilized to overcome these problems is to employ a method where each node owns a collection of virtual nodes rather than one node. This results in the load of a node being averaged over its various virtual nodes. When the number of virtual nodes per actual node is on the order of log M, then the load balancing becomes acceptable.

The consistent hashing placement is ideal for a low power mode when no virtual nodes are used. This is simply because one can power down d−1 out of every d consecutive nodes on the ring and still guarantee that one copy is always active. If the number of nodes is a multiple of d, then this achieves the optimal energy saving with full coverage. That is, exactly 1/d of the nodes need to stay alive (one copy of each data block). The solution is close to optimal if M is not a multiple of d.

The optimal solution described above might not be applicable, since powering down an actual node corresponds to removing a number of virtual nodes, whose locations on the ring are random, and in particular, do not behave nicely when looking at the ordering modulo d. It is not clear that for a high fraction p, there exists a full coverage at all. For a random choice of subset of size Mp, the probability that a single data item is left uncovered is again $$\exp\_q \approx p^d \quad (2)$$

Experiments show that as the number of virtual nodes grows, the coverage behaves closer and closer to the coverage in a random placement.

Figure 4:
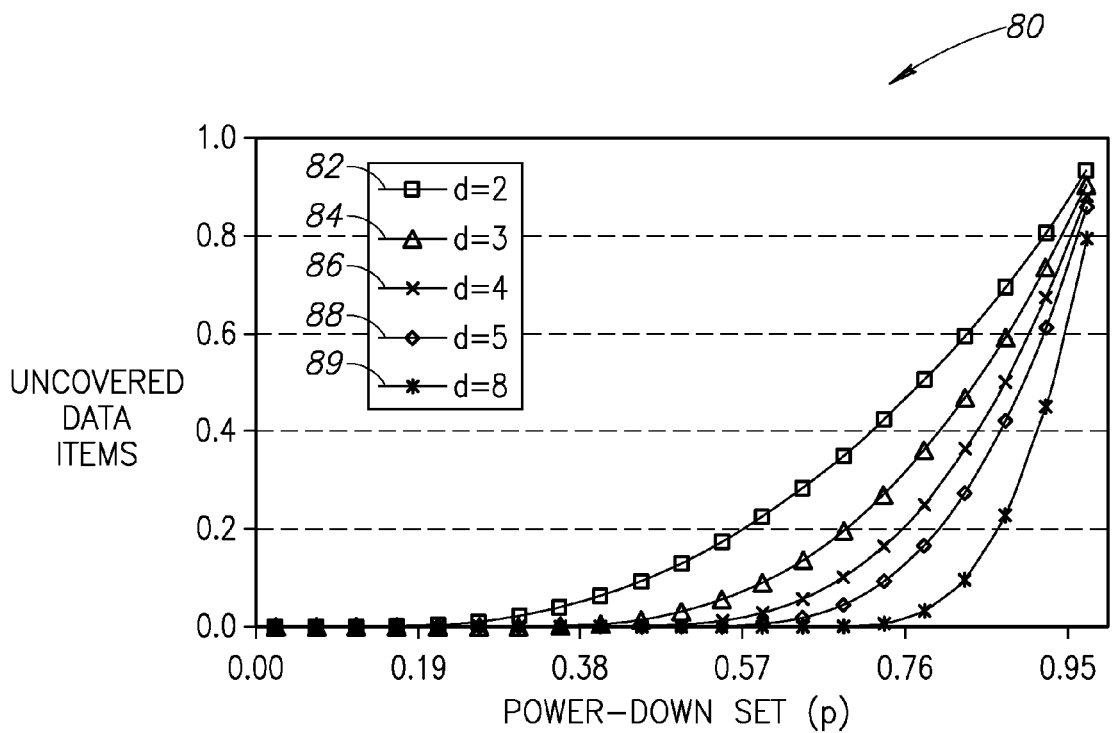
FIG. 4 is a chart illustrating the success of the greedy algorithm in a consistent hashing system implemented on a storage system implementing the full coverage low power mode storage method of the present invention.

For systems where the number of virtual nodes is approximately log M, the maximum value of p where system still achieves full coverage needs to be determined. Moreover, how does the coverage behave beyond this p. In FIG. 4, we learn that this fraction is surprisingly high and grows as the replication parameter d. FIG. 4 comprises a chart evaluating the success of the greedy algorithm in a consistent hashing system as a function of the fraction of the power-down subset p. The graph, generally referenced 80, plots the percentage of uncovered data items against the percentage of nodes to be powered down during a low power mode for a system with M=4096 nodes log M=12 virtual nodes. The graph comprises data series 82 (d=2), 84 (d=3), 86 (d=4), 88 (d=5) and 88 (d=8). The graph shows that a high percentage of nodes can be powered down while maintaining full coverage, with this percentage growing substantially with d. For example, with d=3 it is possible to power down 35% of the nodes and still yield full coverage (with no auxiliary nodes at all).

Therefore, consistent hashing placement is better suited for low power mode than the random placement function. This can be explained as a result of the strong correlations in placement to nodes produced by this scheme. It is also apparent, that for this scheme, the greedy algorithm is significantly more successful than the choosing random subsets.

Low Power Mode Storage Method for Hierarchical Distributed Storage Systems

In a hierarchical distributed storage system, all data items have the same number of replications. The hierarchical distributed storage system comprises one or more nodes, with each node controlling one or more memory storage devices. Since each node is a separate failure domain, no two instances of any data item are stored in the same node (i.e. failure domain).

In operation, the method of the present invention segregates a copy of all data segments into a designated set of memory storage devices. During low utilization period, the system may switch to low power mode, in which all disks are spun down, except for the set of designated disks (which stores a copy for all data segments). Since the placement function for the hierarchical distributed storage system stored a consistent number of replications, the percentage of nodes that can be powered down during a low power mode is p=(d−1)/d. For example, if there are three replications, then two-thirds of the memory storage devices can be powered down during a low power mode while maintaining full data coverage. During a low power mode, reads are performed from the active memory storage devices, while writes are generally buffered and executed (i.e. committed) during full power mode.

In systems where a single node contains more than one memory storage device, the method of the present invention introduces a low power mode that comprises powering down parts of nodes rather than whole nodes. By correlating the placement of data items within nodes, one can switch to a low power mode that maintains a live copy of every data item without changing the placement function of data items across nodes.

As discussed supra, a crucial component in the system implementing the method of the present invention is its placement function. This is the function that given a data block decides on what node to store each of the d copies of this block. In general, the placement function needs to be modified in order to accommodate an optimal low power. There are several strategies for modifying the placement function in order to improve various aspects of the system.

For systems in which a node consists of more than one disk (typically a server and a number of disks), a low power mode in which partial nodes are spun-down (i.e., a subset of the memory storage devices in every node is powered down) is appropriate. In order to achieve an optimal low power mode the number of disks per node needs to be a multiple of the replication parameter d.

The goal is to form a correlation between the locations of the different replicas within their respective host nodes. In a basic setting, for each data block a single replica is designated to be the primary replica. This choice can be made by a random coin flip where each replica is given equal probability. The primary replica is designated to remain powered up during low power mode. Within each node, the disks are divided into two groups: 1/d of the memory storage devices are designated for primary replicas and the rest are for the remaining replicas. Within each node the primary replicas are all located on the designated memory storage devices. According to the random choice, this should account for ~1/d of the blocks stored on the node and should therefore fit in the designated memory storage device. During low power mode, only the designated memory storage devices are active. This enables full coverage of the data (all primaries are up) at the cost of keeping just 1/d of the memory storage devices powered-up (optimal). A main benefit of this method is that the placement function across nodes (which replica resides on what node) can be left unmodified, and only the placement within a node is touched.

In some embodiments, the primary copy of a data segment is also the most frequently accessed copy. If all of the primary copies are segregated together on the same partition of nodes, then this leads to congestion on these nodes. To overcome this congestion, the replica-number and its placement are decoupled. Each data block now holds two special copies, one is the primary copy and the other is designated to stay powered-up (and placed in the special designated set of memory storage devices). In this implementation, the primary copies are distributed evenly across all memory storage devices.

In some embodiments, only a small subset of the memory storage devices is powered down and powered up (i.e. when entering and exiting low power mode). This may cause erosion of this subset more than others, as these repeated operations may shorten the operational life of a memory storage device. To overcome this problem, the memory storage devices are partitioned into in d groups within each node, and the nodes are segregated into d distinct colors (i.e. groups). Next, verify that of the d copies of a data block, there is one residing in every possible color (that is, a 1-1 mapping between copies and colors). Therefore, we can power down all memory storage devices in the system except for memory storage devices of a certain color. The placement guarantees that every data block will have a live copy in this one remaining color.

Figure 5:
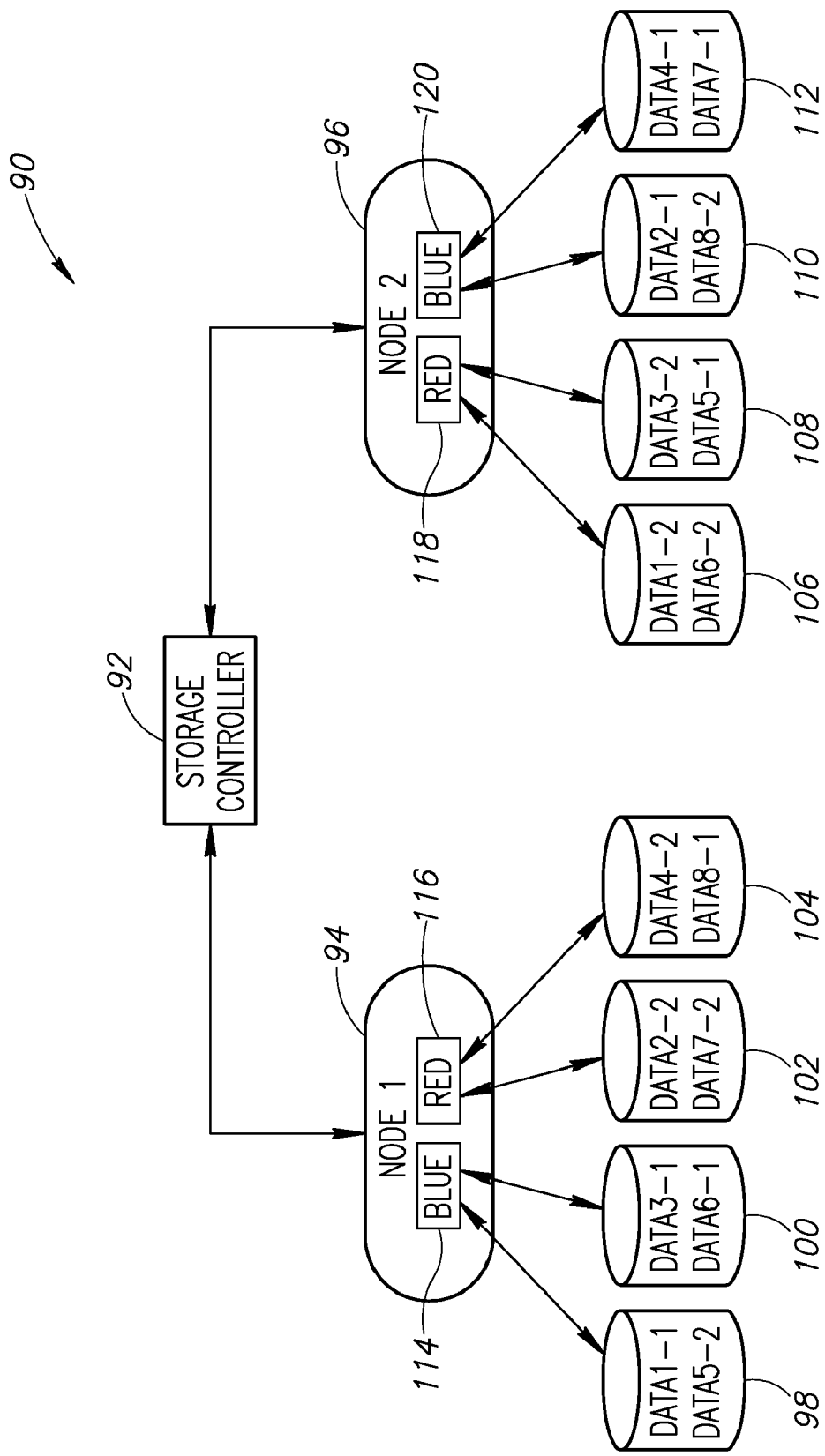
FIG. 5 is a block diagram illustrating a hierarchical distributed storage system implementing the full coverage low power mode method of the present invention.

A block diagram illustrating a hierarchical distributed storage system implementing the full coverage low power mode method of the present invention is shown in FIG. 5. The storage system, generally referenced 90, comprises storage controller 92, nodes 94, 96 and memory storage devices 98, 100, 102, 104, 106, 108, 110, 112. Node 94 is comprised of sub nodes 114 and 116, and node 96 is comprised of sub nodes 118 and 120. Data1-1 and Data1-2 comprise instances of data item Data1, Data2-1 and Data2-2 comprise instances of data item Data2, Data3-1 and Data3-2 comprise instances of data item Data3, Data4-1 and Data4-2 comprise instances of data item Data4, Data5-1 and Data5-2 comprise instances of data item Data5, Data6-1 and Data6-2 comprise instances of data item Data6, Data7-1 and Data7-2 comprise instances of data item Data7, and Data8-1 and Data8-2 comprise instances of data item Data8.

In this storage system d=2 and therefore p=½. Each instance of each data item is stored in a separate failure domain (i.e. node). The sub nodes are assigned colors (in this case red and blue), with each color associated with a full set of all the data items. Implementing a low power mode comprises powering down either the red or blue sub nodes (i.e. their respective memory storage devices), which will power down half of the memory storage devices while retaining full data coverage.

Figure 6:
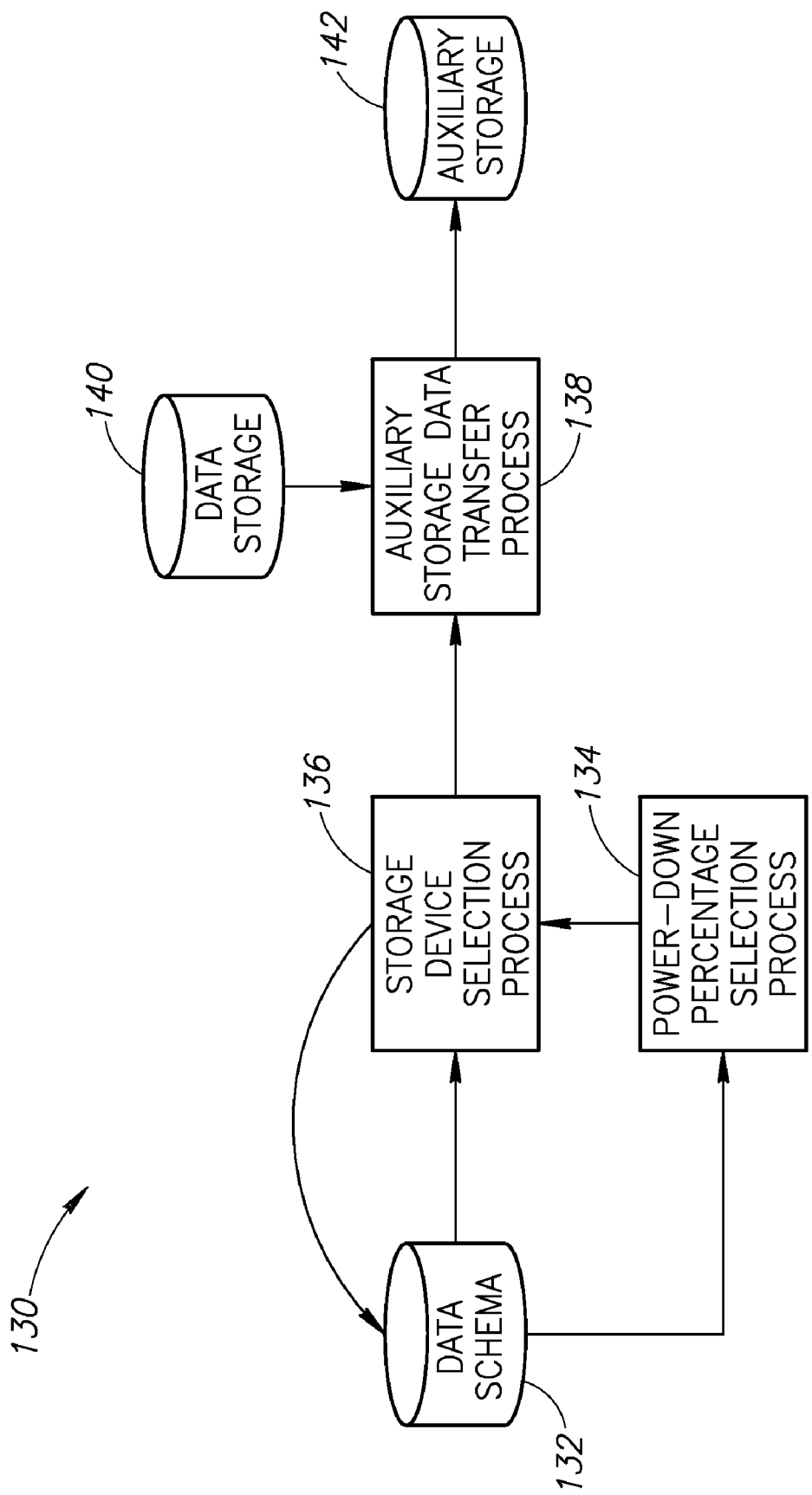
FIG. 6 is a functional block diagram illustrating an example computer processing system implementing the full coverage low power mode method of the present invention.

A functional block diagram illustrating an example computer processing system implementing the full coverage low power mode method of the present invention is shown in FIG. 6. The computer system, generally referenced 130 comprises data schema storage subsystem 132, power down percentage selection process 134, storage device selection process 136, auxiliary storage data transfer process 138, data storage subsystem 140 and auxiliary storage subsystem 142.

In operation, the storage device selection process retrieves the data schema from the data schema storage subsystem and the power down percentage from the power down percentage selection process (i.e. either calculated or a user input parameter). Note that the power down selection process also retrieves the data schema from the data schema storage subsystem. The storage device selection process then determines which memory storage devices will be powered down during low power mode. If there are any data items that need to be copied to an auxiliary memory storage device in order that the low power mode retains full data coverage, then the identity of these data items is sent to the auxiliary storage data transfer process and the data schema is updated accordingly. Finally, the identified data items are copied from the data storage subsystem to the auxiliary storage subsystem. Note that in some embodiments of the present invention (e.g. when a greedy algorithm for consistent hashing is implemented), the storage device selection process and the power-down percentage selection processed are interleaved within a single process.

Figure 7:
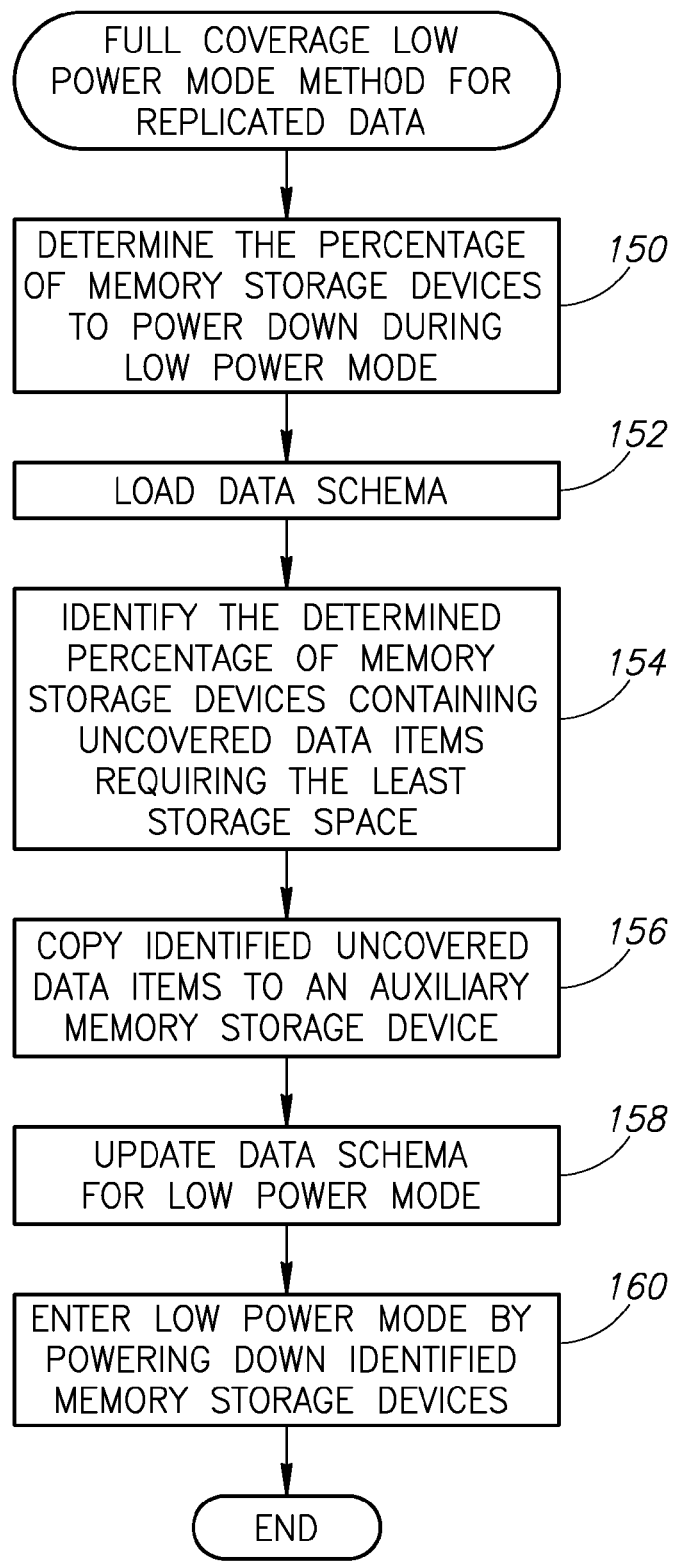
FIG. 7 is a flow diagram illustrating the replicated data full coverage low power mode definition method of the present invention.

A flow diagram illustrating the replicated data full coverage low power mode definition method of the present invention is shown in FIG. 7. First, the percentage of memory storage devices to be powered down during low power mode is determined (step 150). The data schema is loaded (step 152) and the determined percentage of memory storage devices storing uncovered data items requiring the least storage are identified (step 154). The uncovered data items from the identified memory storage devices are then copied to an auxiliary memory storage device (step 156), and the data schema is updated accordingly (step 158). Finally, to enter low power mode, the storage system powers down the identified memory storage devices (step 160).

Figure 8:
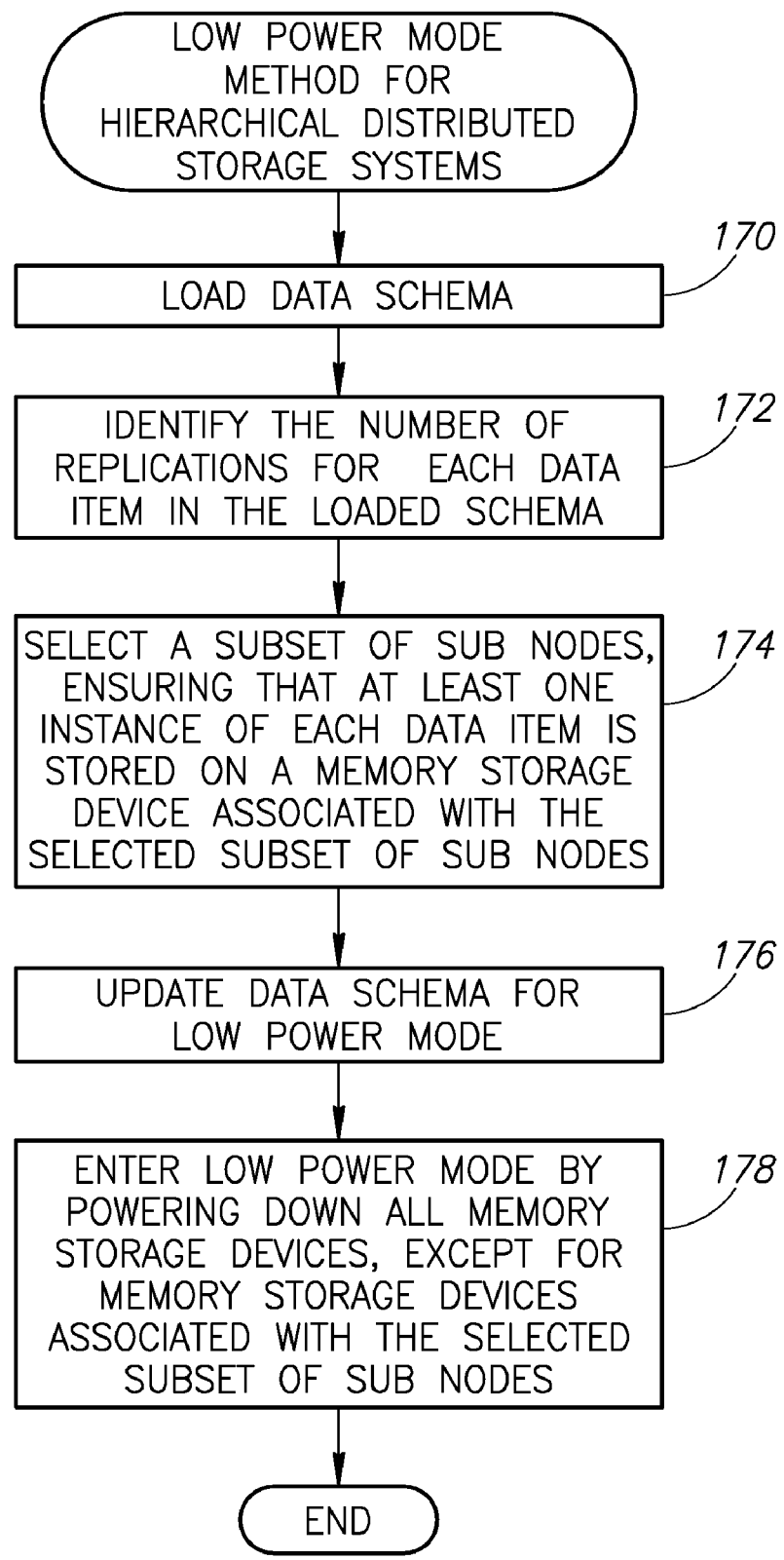
FIG. 8 is a flow diagram illustrating the hierarchical distributed storage system low power mode definition method of the present invention.

A flow diagram illustrating the hierarchical distributed storage system low power mode definition method of the present invention is shown in FIG. 8. First, the data schema is loaded (step 170), and the number of replications for each data item in the data schema is identified (step 172). A subset of sub nodes is selected to remain active (i.e. powered up) during low power mode, ensuring that at least one instance of each data item is stored on memory storage devices associated with the selected subset of sub nodes (step 174). The data schema is then updated accordingly (step 176). Finally, entering low power mode is accomplished by powering down all memory storage devices except for those selected in step 174 (step 178).

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of selecting one or more memory storage devices in a storage system, said storage system comprising a first quantity of memory storage devices storing a plurality of replicated data items, the method comprising the steps of:
   setting a percentage of said first quantity of memory storage devices to be selected in a first computer process and providing said set percentage to a second computer process;
   identifying a second quantity of memory storage devices in accordance with said set percentage in said second computer process, said identified memory storage devices storing a subset of said plurality of replicated data items; and
   wherein memory storage devices not included in said identified second quantity of memory storage devices store at least one instance of each data item not included in said subset of said plurality of replicated data items.

2. The method according to claim 1, wherein said set percentage is calculated by said first computer process.

3. The method according to claim 1, wherein said set percentage is less than or equal to a maximum threshold percentage.

4. The method according to claim 1, wherein said set percentage is an input parameter to said first computer process.

5. The method according to claim 1, wherein said identified second quantity of memory storage devices stores all instances of said subset of said plurality of replicated data items.

6. The method according claim 1, wherein said subset of said plurality of replicated data items is copied to an auxiliary memory storage device.

7. The method according to claim 1, further comprising entering low power mode by powering down all memory storage devices except for memory storage devices associated with said identified second quantity of memory storage devices to be active during low power mode.

8. A computer program product for selecting one or more memory storage devices in a storage system, said storage system comprising a first quantity of memory storage devices storing a plurality of replicated data items, the computer program product comprising:
   a computer usable medium having computer usable code embodied therewith, the computer usable program code comprising:
   computer usable code configured for setting a percentage of said first quantity of memory storage devices to be selected in a first computer process and providing said set percentage to a second computer process;
   computer usable code configured for identifying a second quantity of memory storage devices in accordance with said set percentage in said second computer process, said identified memory storage devices storing a subset of said plurality of replicated data items; and
   wherein memory storage devices not included in said identified second quantity of memory storage devices store at least one instance of each data item not included in said subset of said plurality of replicated data items.

9. The computer program product according to claim 8, wherein said set percentage is calculated by said first computer process.

10. The computer program product according to claim 8, wherein said set percentage is an input parameter to said first computer process.

11. The computer program product according to claim 8, wherein said set percentage is less than or equal to a maximum threshold percentage.

12. The computer program product according to claim 8, wherein said second quantity of memory storage devices stores all instances of said subset of said plurality of replicated data items.

13. The computer program product according to claim 11, wherein said subset of said plurality of replicated data items is copied to an auxiliary memory storage device.

14. The computer program product according to claim 8, further comprising computer usable code configured for entering low power mode by powering down all memory storage devices except for memory storage devices associated with said identified second quantity of memory storage devices to be active during low power mode.

15. A method of implementing a full coverage low power mode in a storage system, said storage system comprising a plurality of replicated data items stored on a plurality of memory storage devices, the method comprising the steps of:

setting a percentage of memory storage devices to be powered down during said low power mode in a first computer process and providing said set percentage to a second computer process;

identifying a first quantity of said memory storage devices in accordance with said set percentage, said identified first quantity of memory storage devices storing a subset of said plurality of replicated data items in said second computer process; and providing said subset to a third computer process; and copying data items stored solely on said subset to an auxiliary storage subsystem in said third computer process, said auxiliary storage subsystem comprising a second quantity of memory storage devices.

16. The method according to claim 15, wherein said set percentage is greater than or equal to zero.

17. The method according to claim 15, wherein said set percentage is calculated by said first computer process.

18. The method according to claim 15, wherein said set percentage is an input parameter to said first computer process.

19. The method according to claim 15, wherein said memory storage devices not included in said identified second quantity of memory storage devices store at least one instance of each data item not included in said subset of said plurality of replicated data items.

20. The method according to claim 15, wherein storage space of said second quantity of auxiliary storage devices is greater than or equal to storage space required by said subset.

21. The method according to claim 15, wherein powering down said identified memory storage devices results in a full coverage low power mode for said storage system.

22. A method of implementing a full coverage low power mode in a hierarchical distributed storage system storing one or more replicated data items, said distributed storage system comprising a plurality of memory storage devices, the method comprising the steps of:

determining the number of replications of each said data item in said hierarchical distributed storage system;

identifying one or more subsets of said plurality of memory storage devices, each said identified subset storing one instance of each of said one or more replicated data items;

selecting one identified subset of said plurality of memory storage devices to be active during low power mode; and entering low power mode by powering down all memory storage devices except for memory storage devices associated with said identified subset of said plurality of memory storage devices to be active during low power mode.

23. The method according to claim 22, wherein the method of storing one of said one or more replicated data items on said hierarchical distributed storage system comprised the steps of:

identifying the number of instances said one or more replicated data item are to be stored on said hierarchical distributed storage system; and storing each instance of said replicated data item on a memory storage device coupled to a separate distinct node of said hierarchical distributed storage system.

24. The method according to claim 22, wherein each said separate distinct node is coupled to one or more memory storage devices.

25. The method according to claim 22, wherein each instance of each said data item is stored on a distinct memory storage device.

* * * * *